United States Patent [19]
Takatori

[11] Patent Number: 5,581,659
[45] Date of Patent: Dec. 3, 1996

[54] SYSTEM FOR SOLVING AN ADAPTATION PROBLEM BY ADJUSTING WEIGHTS OF A NEURAL NETWORK BASED ON CHANGES IN A COST FUNCTION

[75] Inventor: Sunao Takatori, Tokyo, Japan

[73] Assignee: Yozan Inc., Tokyo, Japan

[21] Appl. No.: 278,232

[22] Filed: Jul. 21, 1994

[30] Foreign Application Priority Data

Sep. 13, 1993 [JP] Japan ................... 5-252406

[51] Int. Cl.$^6$ ................... G06E 1/00; G06E 3/00
[52] U.S. Cl. ................... 395/23; 395/21; 395/24
[58] Field of Search ................... 395/21, 23, 24

[56] References Cited

U.S. PATENT DOCUMENTS

| | | |
|---|---|---|
| 4,660,166 | 4/1987 | Hopfield . |
| 4,719,591 | 1/1988 | Hopfield et al. . |
| 5,113,367 | 5/1992 | Marrian et al. ................... 364/819 |
| 5,148,045 | 9/1992 | Oyanagi ................... 395/24 X |
| 5,257,342 | 10/1993 | Takatori et al. ................... 395/23 |
| 5,402,359 | 3/1995 | Oyanagi ................... 364/491 |
| 5,438,645 | 8/1995 | Oyanagi ................... 395/24 |

FOREIGN PATENT DOCUMENTS

| | | |
|---|---|---|
| 561672 | 9/1993 | Japan . |
| WO86/06569 | 11/1994 | WIPO . |

OTHER PUBLICATIONS

Chauvin, Y., "Principal Component Analysis by Gradient Descent on a Constrained Linear Hebbian Cell," IEEE Int'l Conf. on NN, 1989, pp. 1-373-80.

Brandt, R. D., "Alternative Networks for solving the Travelling Salesman Problem and the List-Matching Problem," IEEE Int'l Conf. on NN, 1988, pp.. 11-333-40.

*Primary Examiner*—Robert W. Downs
*Assistant Examiner*—A. Katbab
*Attorney, Agent, or Firm*—Cushman, Darby & Cushman

[57] ABSTRACT

A system and method for solving adaptation problems including a neural network having multiple neurons. Each neuron includes outputs that are input to every other neuron excepting itself, and a cost calculation portion for calculating cost based on a formula that uses outputs from each neuron as variables with respect to the given adaptation problem. Adaptation problems are solved by i) randomly setting a coupling weight for each neuron based on other neuron operations and an output of each neuron in the initial state, ii) calculating a net value with respect to at least one neuron, iii) calculating cost by transmitting the output of each neuron after the net value calculation to the cost calculation portion, iv) simultaneously feeding back the difference between the cost before and after the net calculation to a neural network of mutual connection, v) correcting the coupling weight of at least one neuron according to the difference, and repeatedly changing the state of the neural network until a predetermined condition is established, and vi) changing the state of the neural network after the predetermined condition is satisfied, realizing the solution to the adaptation problem based on the output of each neuron. It is unnecessary to determine the coupling weight of synapse preliminarily when using the present invention. The present invention can solve adaptation problems having various cost functions to which conventional models cannot be applied.

25 Claims, 11 Drawing Sheets

SYSTEM FOR SOLVING AN ADAPTATION PROBLEM BY ADJUSTING WEIGHTS OF A NEURAL NETWORK BASED ON CHANGES IN A COST FUNCTION

FIELD OF THE INVENTION

The present invention relates to the system for solving problems of adaptation, and more specifically it relates to a system which changes automatically changing the coupling weight of synapses of each neuron by feedback—that is, a system which adapts self-organizing networks to an indicated problem—and relates to a method for executing this processing using software.

BACKGROUND OF THE INVENTION

Hopfield model is known as a representative neural network that has mutually connected nodes. This model is structured, as in FIG. 16, by inputting the outputs for each of multiple parallel neurons as inputs for every other neuron excepting that of itself.

Defining the output of i-th neuron as "$x_i$", the coupling weight of synapses of output of i-th neuron as "$w_{ij}$", and the threshold of i-th neuron as "$\theta_i$", the energy "E" of neural network of Hopfield can be expressed by the formula (1) when the coupling weight of synapses is symmetry ($w_{ij}=w_{ji}$).

$$E=-(\tfrac{1}{2})\Sigma w_{ij}x_ix_j-\Sigma\theta_ix_i+G \qquad (1)$$

Here, "G" is an item of integral calculus representing an inverse function of a cost function ("F"; G=1/F). It is "0" in a dispersed model in which the output of a neuron is either "0" or "1".

In this specification, "cost" means the result obtained through the predetermined function performed on the solutions of adaptation problems. It is used with the meanings of not only the economical expense but also the sense including the conception of risk, time, etc. for the base of evaluation of a problem to be solved.

When an adaptation problem is solved using a neural network of Hopefield type, the following steps are executed: i) setting cost function "F" for solving an adaptation problem; ii) coupling weight "wij" is determined for all neurons according to the cost function "F" so that energy "E" is coincident with cost function "F"; and iii) the initial value is given to each neuron and the neural network begins working.

The neural network given a random initial value repeats Markov transition through the Monte Carlo method. The solution of the adaptation problem is obtained when the output of each neuron is stabilized and converged by repeating the predetermined number of transitions.

SUMMARY OF THE INVENTION

However, when the conventional Hopefield model is used to solve an adaptation problem, a set of two secondary formulas including a coupling weight of synapse must be preliminarily solved so that the Hopfield energy formula will be coincident with the cost function "F" (step ii above). As the number of variables is large, the preparation increases in a manner of geometrical series before the neural network ever begins working to converge. That is, in the conventional model, the adaptational solution is obtained by performing Markov transition after the coupling weight is settled in order that the cost function "F" is fit with the formula of the energy of a neural network: this process takes a lot of time particularly the fitting.

The cost function "F" of the adaptation problem solvable by Hopfield model is differentiable, and the power of it is raised up to the second. However, many actual adaptation problems use a dispersive cost function which is indifferentiable, or which has a power equal to or more than the third. Therefore, the conventional model is applied within narrow limits.

In Hopfield model, as the neural network stops working on the point of the local minimum first arrived at when Markov transition is executed, the desired minimum value corresponding to minimum cost is obtained only when selecting a start point which has no local minimum within the range from the start point itself to the minimum point corresponding to the minimum cost. If a local minimum does exist between the start point and the minimum point corresponding to the minimum cost, that local minimum will be realized in error preventing realization of the minimum point corresponding to the minimum cost. This problem of the local minimum is the fatal shortage. In order to avoid it, some methods are adopted such as that introducing probability transition.

The present invention is invented so as to solve the above conventional problems and has an object to provide a system for solving adaptation problems. The present invention is applicable to adaptation problems which has various cost functions to which conventional models cannot be applied is that a preliminary determination of the coupling weight of of synapse becomes unnecessary.

In order to achieve the above object, the system for solving adaptation problems of this invention comprises a neural network of mutual connection having multiple neurons the output of each neuron being an input to every neuron excepting itself, self, and a cost calculation means for determining cost by using an output of each neuron as a variable to the cost calculation formula with respect to the given adaptation problem. It has the following steps: i) randomly setting a coupling weight of each neuron from other neurons and an output of each neuron in the initial state, ii) determining the net value with respect to at least one neuron, iii) calculating cost by transmitting the output of each neuron after the net value calculation to the cost calculation means, iv) simultaneously, feeding back "$\Delta$COST" which is the difference between the cost before and after the net value calculation to a neural network of mutual connection, v) correcting the coupling weight of the neuron according to "$\Delta$COST", in the same time, repeating the step transitioning the state of the neural network of mutual connection, vi) completing transition step when the predetermined condition is satisfied and the output of each neuron is the solution of the adaptation problem.

PREFERRED EMBODIMENT OF THE PRESENT INVENTION

Hereinafter, described is an embodiment of a system for solving problems of an adaptation method in connection with the present invention.

Figure 1:
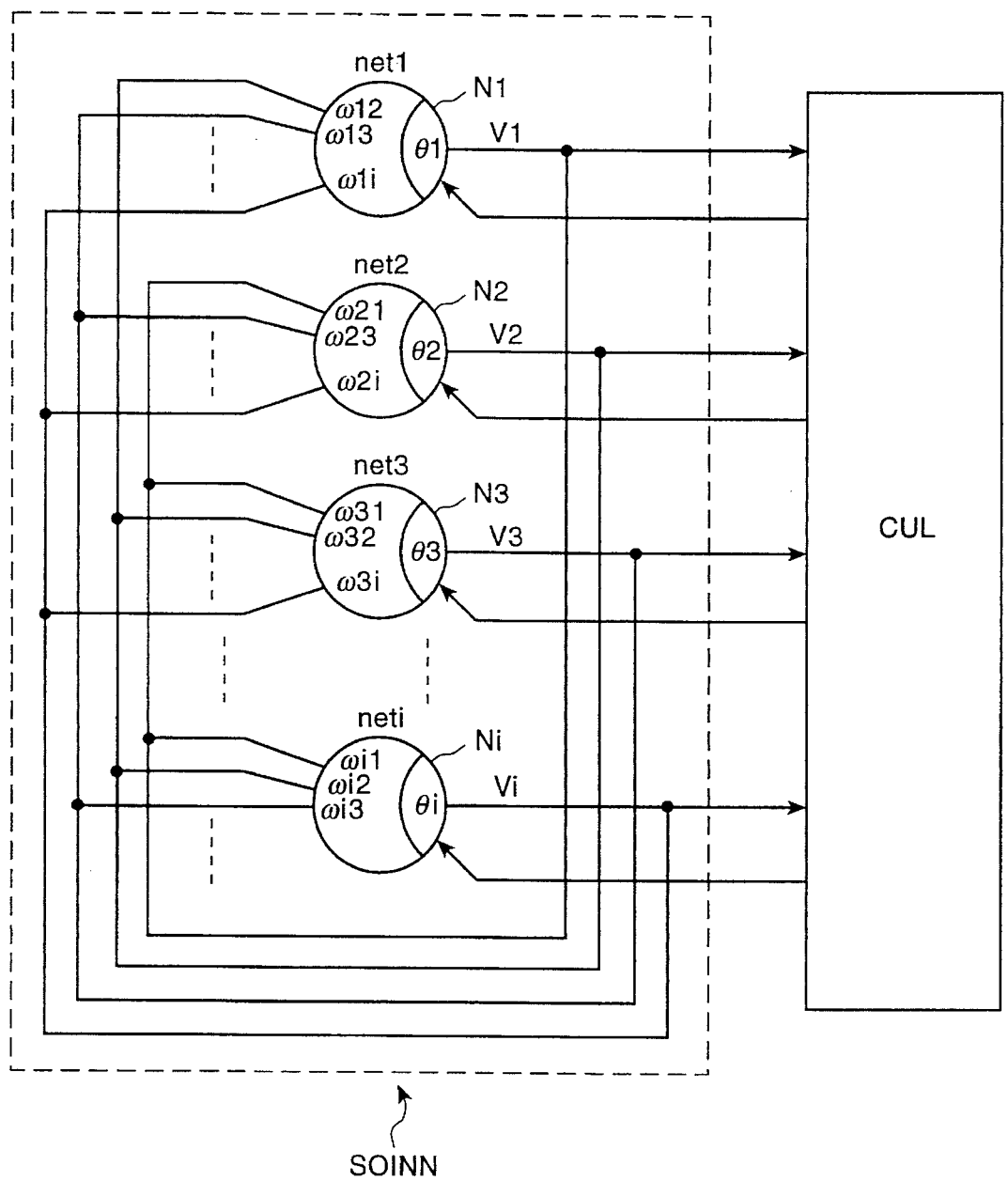
FIG. 1 shows a diagram of a theoretical construct of the first embodiment of the system for solving the adaptation problem according to the present invention.

FIG. 1 shows the outline of the system for solving problems of an adaptation method of this invention. This system comprises a Self Organic Interconnected Neural Network ("SOINN") including "i" neurons of "$N_i$", each of whose outputs is the input for every other neuron, and a cost calculation means "CUL" for calculating the cost by using the output of each neuron as a variable to the cost calculation formula for solving the adaptation problem, A general wide-use computer can be the cost calculation means "CUL".

The net value "$net_i$" of i-th neuron "$N_i$" is obtained by calculating the total summation of the multiplication of "$x_j$" which is the output of j-th neuron (excepting itself) "$N_j$" and "$w_{ij}$" which is the coupling weight of "$x_j$" for "$N_i$", and adding the threshold "$\theta_i$" to the summation, as shown in formula (2).

$$net_i = \Sigma w_{ij} x_j + \theta_i \tag{2}$$

The output of each neuron "$x_i$" is 1 when "$net_i$"$\geq 0$ and it is 0 when "net i"$<0$ with respect to the case of dispersion model. It changed from 0 to 1 ($0 \leq x_i \leq 1$) according to the value of "net i" with respect to the case of continuation model.

In a neural network, a set of output values of all neurons is defined as the state of the network on the point of the time. Investigating the action of a neural network means tracing the change of state according to time, that is the state transition. When the state transition disappears or converges within the predetermined pitch, it is recognized that the neural network has reached the equilibrium point. The state of a neural network is either to continue changing (divergence, oscillation) or to reach the equilibrium (convergence).

In the system of this invention, coupling weight "$w_{ij}$" of each neuron from one of other neurons and "$x_i$" of an output of each neuron are randomly set initially. A net calculation for at least one neuron is performed, and cost ("cost") is calculated by sending an output of each neuron after net calculation to cost calculation means "CUL". The difference of the cost between before and after the net calculation "$\Delta$COST" is then fed back to SOINN. SOINN corrects coupling weight "wij" of a neuron for which the net calculation was performed according to "$\Delta$COST" while the state transition, is repeated until predetermined conditions are satisfied. The output of each neuron is obtained on the completion as an answer of the adaptation problem. The conditions for the completion of the state transition can be conceived that i) the output of SOINN is stable, ii) the step of the state transition is repeated a predetermined number of times, iii) the time spent from the beginning is the predetermined one, and iv) the output cost value becomes smaller than the predetermined standard one. One of these conditions can be set solely. Or, setting a plural number of these conditions, the state transition is completed when one of them or all of them are satisfied.

It is possible without solving a question from filling to provide a system that works and that works flexibly on the adaptation problem having a complicated cost function by calculating cost function by calculation means "CUL" outside of the neural network, and feeding back only the fluctuated value of a cost.

The neuron input to the Hopfield's formula of energy always decreases the actual energy on the state transition. The case is supported that the output "Vi" of each neuron "Ni" is changed in the mutually connected neural network randomly given "wij" at the initial stage, on Markov transition, without solving a filling question at all in connection with Hopfield's energy formula.

Here, in instance, a case is described that each neuron for a neural network has dispersive input and output, that is, the model having outputs of 0 and 1. "$\Delta$Enet" is the quantity of the change of energy in the neural network which changes according to the state transition of an output of a neuron. It is defined by formula (3) by the reason that, clearly, the state transition always causes the decrease of energy.

$$\Delta Enet = -[(V_{i(t+1)}) - V_{i(t)} \cdot net_i] \tag{3}$$

$V_{i(t)}$ is an output "$x_i$" of i-th neuron on the time "t". "$\Delta$Enet" defined by the formula above is always negative when the output of neuron changes. It is because when Vi changes into 1 from 0, $(V_{i(t+1)} - V_{i(t)})$ is +1 and "net i" is positive, therefore, $\Delta$Enet is negative. On the other hand, when $V_i$ changes into 0 from 1, $(V_{i(t+1)} - V_{i(t)})$ is $-1$ and "net i" is negative, therefore, $\Delta$Enet is negative in this case, too.

Accordingly, it is guaranteed that net energy converges at minimum status as long as formula (3) is true. Though formula (3) is the same as the formula of change of energy derived from Hopfield's energy formula, it is not limited within Hopfield's energy formula. The formula of change of energy is not limited by formula (3). Other formula will do if it is guaranteed that the change of state always causes the decrease of energy, as shown in generalized formula (4). Sgn(x) is a function for extracting the mark of "x".

$$\Delta E_{net_i} = -\lambda[(V_{i(t+1)} - V_{i(t)}) \cdot net_i] \quad (4)$$

$$\lambda = \text{Sgn}\{(V_{i(t+1)} - V_{i(t)}) \cdot net_i\}$$

In order to make the convergence of net energy at the minimum state the same sense as the convergence of cost at the minimum, the neural network is self-organized so that ΔEnet is equal to ΔCOST (ΔEnet=ΔCOST) or net energy itself is the cost.

Formula (5) is obtained by dividing both sides by $(V_{i(t+1)} - V_{i(t)})$. It is necessary that "$net_i$", the net value of a neuron having output changes satisfies formula (6) otherwise ΔEnet will not be equal to ΔCOST (ΔEnet=ΔCOST) as required. Therefore, a teacher signal "T" for "$net_i$" of net value of a neuron on the process of self-organization is expressed by formula (7).

$$-\Delta Enet/(V_{i(t+1)} - V_{i(t)}) = net_i \quad (5)$$

$$-\Delta COST/(V_{i(t+1)} - V_{i(t)}) = net_i \quad (6)$$

$$T = -\Delta COST/(V_{i(t+1)} - V_{i(t)}) \quad (7)$$

In the case of a dispersion model, $(V_{i(t+1)} - V_{i(t)})$ is a section constant of 1 and −1 when an output is changed, therefore, the right side of formula (6) is the same as what is added to ΔCOST.

Conventionally, back propagation is known as the learning method for a neural network of feed-forward type. This method tries to make the squared error of the actual output of a neuron and a teacher signal of an ideal output given from outside to be the minimum. As a differential of an output is included in the formula for changing the coupling weight in the method, it cannot be applied to a neuron whose output function is not differentiable. In conventional learning, the output has to be preliminarily established to be a teacher signal, therefore, it cannot be applied to a case to solve the unknown problem.

The method of the embodiment is different from the conventional back propagation on the two points: i) a learning method is newly applied to a neural network mutually connected for changing coupling weight of synapses; and ii) a teacher signal is given to a net value of a neuron, not to an output of a neuron. That is, the method of this embodiment can be applied even if the output of a neuron is a dispersive function not differentiable.

This method can be applied to an unknown problem by changing the coupling weight using the feedback from the cost calculation means, and by self-organizing a mutually connected neural network according to the problem.

When teacher signal "T" is determined, the correction of the value of "$net_i$" can be the general correction of squared error as shown in formula (8).

$$\text{Error}_i = \frac{1}{2}(T_i - net_i)^2 \quad (8)$$

Formula (9) shows the differential value of "$\text{Error}_i$" by $w_{ij}$ when coupling weight $w_{ij}$ is changed. Expressing the coefficient of the change of coupling weight by "η" and defining $\Delta w_{ij}$ of the change of $w_{ij}$ by formula (10), this formula can be represented by formula (11) by formulas (7) and (8).

$$\frac{\partial \text{Error}_i}{\partial w_{ij}} = \frac{\partial \text{Error}_i}{\partial net_i} \cdot \frac{\partial net_i}{\partial w_{ij}} = -(T_i - net_i) \cdot V_j \quad (9)$$

$$\Delta w_{ij} = -\eta \cdot \frac{\partial \text{Error}_i}{\partial w_{ij}} \quad (10)$$

$$\Delta w_{ij} = \eta \cdot \{-\Delta COST/(V_{i(t+1)} - V_{i(t)}) \text{ to } net_i\} \cdot V_j \quad (11)$$

As the threshold $\theta_i$ of neuron $N_i$ can be defined by considering that the synapse connection is always inputted as "1" and the coupling weight is wn+1, the change $\Delta\theta_i$ can be expressed by formula (12).

$$\Delta\theta_i = \eta \cdot (-\Delta COST/(V_{i(t+1)} - V_{i(t)}) - net_i) \quad (12)$$

When output $V_i$ changes, the cost calculated by cost calculation means also changes. The formula above means that coupling weight $w_{ij}$ is changed so that the change of the cost is negative $(\Delta W_{ij} \propto -\Delta COST)$. Coefficient "η" is a constant from 0 to 1 $(0 \leq \eta \leq 1)$. When it is too large, the output oscillates, and when too small, the speed of self-organization is slow.

With respect to FIG. 1, the explanation is made on the assumption that the part of SOINN is realized by hardware. All of SOINN and cost calculation means can be realized by software on a computer of wide-use.

In the case, a plural number of sets of calculation step means are prepared, which comprises a plural number of multiplication steps for multiplying a plural number of input by coupling weight, an addition step for summing the multiplication results, and a function step for outputting the predetermined calculation result. The sets of calculation steps correspond to each neuron in FIG. 1. These sets of calculation steps are structured in order that an output of each calculation step is an input of a multiplication step of one of other sets of calculation steps.

Also, it comprises a cost calculation step for calculating a cost by inputting the output of each calculation step above to the cost calculation formula which is for calculating the answer of the given adaptation problem, a cost oscillation calculation step for calculating ΔCOST which is the difference of the cost between before and after the calculation, and correction step for correcting the coupling weight of the set of calculation steps calculated according to ΔCOST.

At the initial stage, randomly setting an output of each set and coupling weight, an output is renewed through the steps of multiplication, addition and function steps corresponding to one of the sets of calculation steps. The renewed output is then input to one of other sets of calculation steps, and sequentially other sets of calculation steps are performed.

Repeating the performances of a set of steps of calculation, cost calculation step, cost oscillation calculation step and correction step until the predetermined conditions are satisfied, each step is completed when the predetermined conditions are satisfied, and the output of the set of each calculation steps is output as the answer of the adaptation problem.

Here, as described above, the predetermined conditions for completion are, stability of an output of each function step, the number of repetition, spent time, calculated cost value, and so on.

Figure 2:
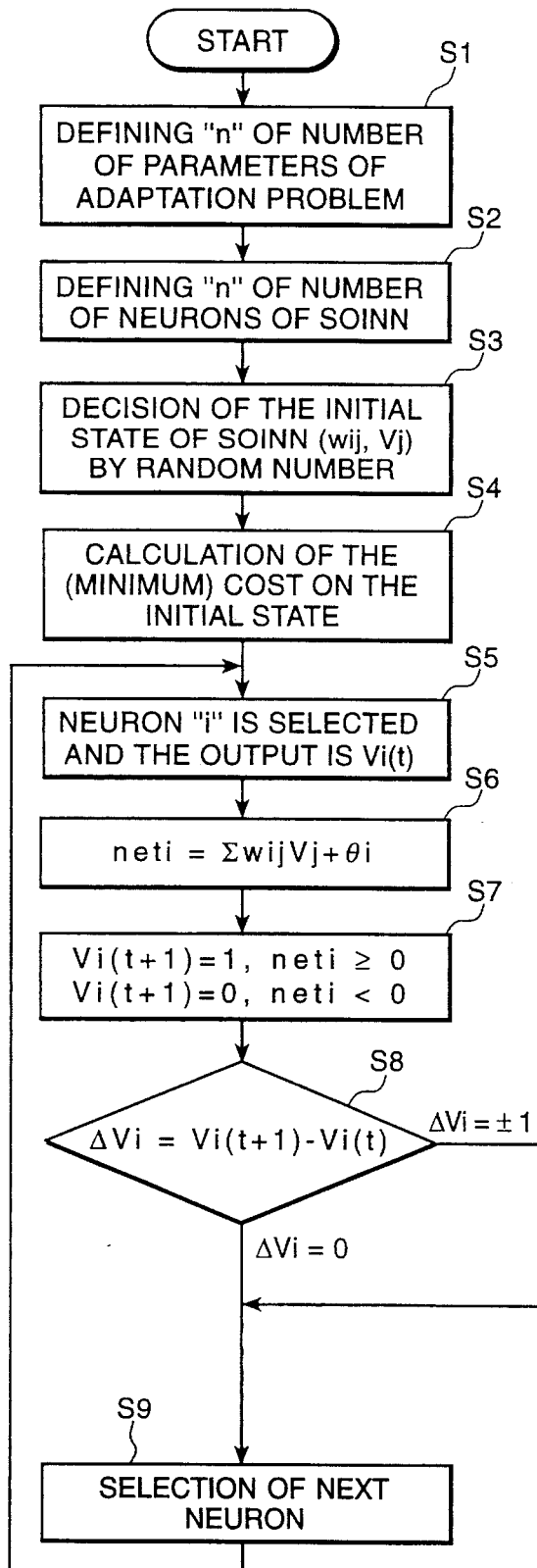
FIG. 2 shows a flowchart of the processing of the system in the embodiment.
Figure 2:
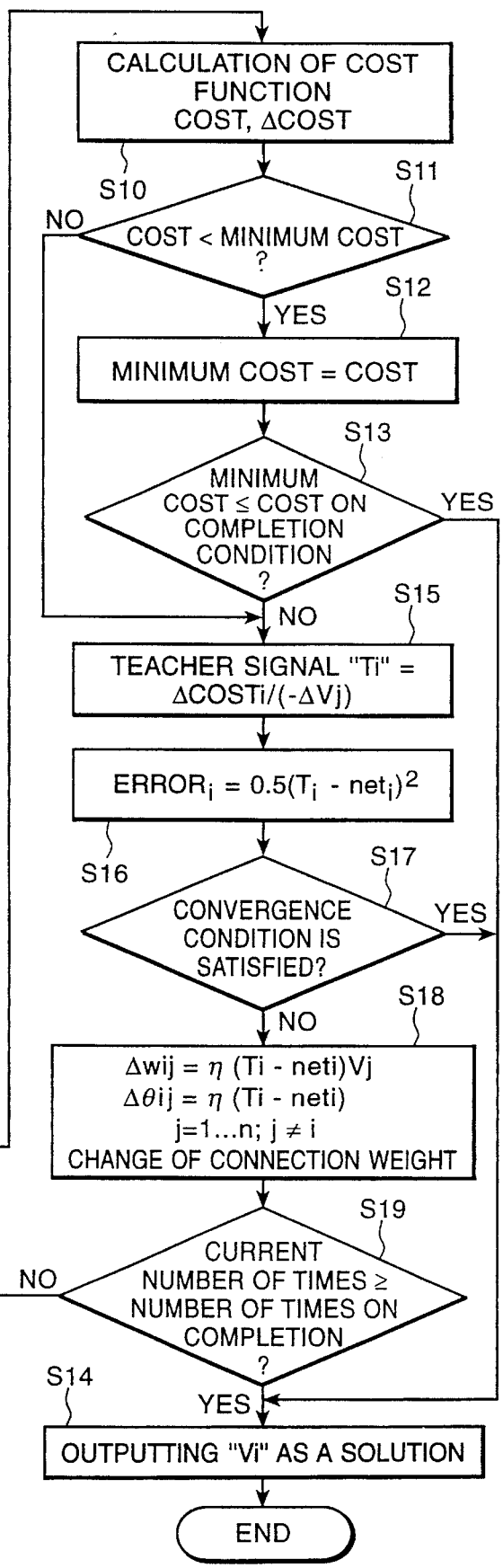

FIG. 2 shows a flowchart of the processing of the system for solving the adaptation problem of the above. The number of parameters "n" included in the cost function of the adaptation problem is set on step 1 (S1) and the number of "n" of neurons are prepared in SOINN on step 2 (S2), On step 3 (S3), the coupling weight "$w_{ij}$" and "$V_i$" of an output of each neuron is determined under the initial stage of SOINN by generating the random numbers. Here, for example, $w_{ij}$ is determined to be a real number of −0.3 to 0.3 $(-0.3 \leq w_{ij} \leq 0.3)$ and $V_i$ is determined to be either 1 or 0, randomly.

On step 4 (S4), the cost on the initial stage in cost calculation means according to each output and coupling weight randomly determined.

A neuron "i" is selected and preserved as $V_{i(t)}$ on step 5 (S5), the net value "$net_i$" is calculated by net calculation shown in formula (2) on step 6 (S6), and $V_{i(t+1)}$ of the output of neuron "i" is calculated on step 7 (S7).

On step 8 (S8), judging $\Delta V_i$ of the difference between the output before calculation $V_{i(t)}$ and the one after calculation $V_{i(t+1)}$ is 0 or ±1, next neuron is selected and processings from step 5 are repeated on step 9 (S9) when $\Delta V_i$ is 0.

When $\Delta V_i$ is ±1, the cost "COST" and cost oscillation $\Delta$COST are calculated in cost calculation means using the output of each neuron on step 10 (S10), and it is judged on step 11 (S11) if the obtained cost is smaller than the minimum cost until now or nor. When the obtained cost is smaller than the minimum cost, the minimum cost is substituted for the obtained cost on step 12 (S12). When the minimum cost is judged on step 13 (S13) to be smaller than the cost on predetermined completion condition, the output of each neuron Vi is output as the answer of the adaptation problem on step 14 (S14) and the processing is completed.

When the cost is judged to be larger than the minimum cost on step 11 or when the minimum cost is larger than the cost of completion condition on step 13, a teacher signal "$T_i$" is calculated by formula (7) according to cost oscillation on step 15 (S15) and an "$Error_i$" is calculated through square error correction method by formula (8) on step 16 (S16).

When the value of the error "$Error_i$" is continuously 0 by predetermined times, it is judged to satisfy the convergence condition on step 17 (S17) and the processing is completed through step 14.

When "Error i" is not 0, coupling weight $w_{ij}$ and $\theta_i$ are changed according to $\Delta w_{ij}$ and $\Delta \theta_i$ calculated by formulas (11) and (12) on step 18 (S18).

When the number of times of the repeat is up to the predetermined one to be completed on step 19 (S19), the processing is completed through step 14: when it is not up to the predetermined number of times to be completed, the next neuron is selected on step 9 and the processing is returned to step 5.

Repeating net calculation and coupling weight correction sequentially by each neuron through the processings form step 5 to 18, the output of each neuron is extracted on step 14 (S14) as the answer of the adaptation problem when one of completion conditions is satisfied. The self-organization by the change of coupling weight can be performed in two ways: a) it is performed by once on each neuron; b) it is performed by a plural number of times on a neuron, and is moved on the next neuron.

In FIG. 2, cost, convergence and the number of times are set on OR-condition as the completion condition. Both of them are adopted, a) only one of the conditions is set, and b) all of them are set in AND-condition. Also, spent time from the beginning of the processing will be the completion condition.

The relationship between the state of networks is defined as Hamming distance. Supposing the present condition to be the beginning point, Hamming distance of the state that the output of only one neuron is changed is "1".

In the case that a neuron is selected by one and net calculation is performed as above, the next state of the network is either the same one keeping the state or that in which only the output of the neuron of the object of net calculation is reversed, that is, transited to the state to Hamming distance 1.

Figure 3:
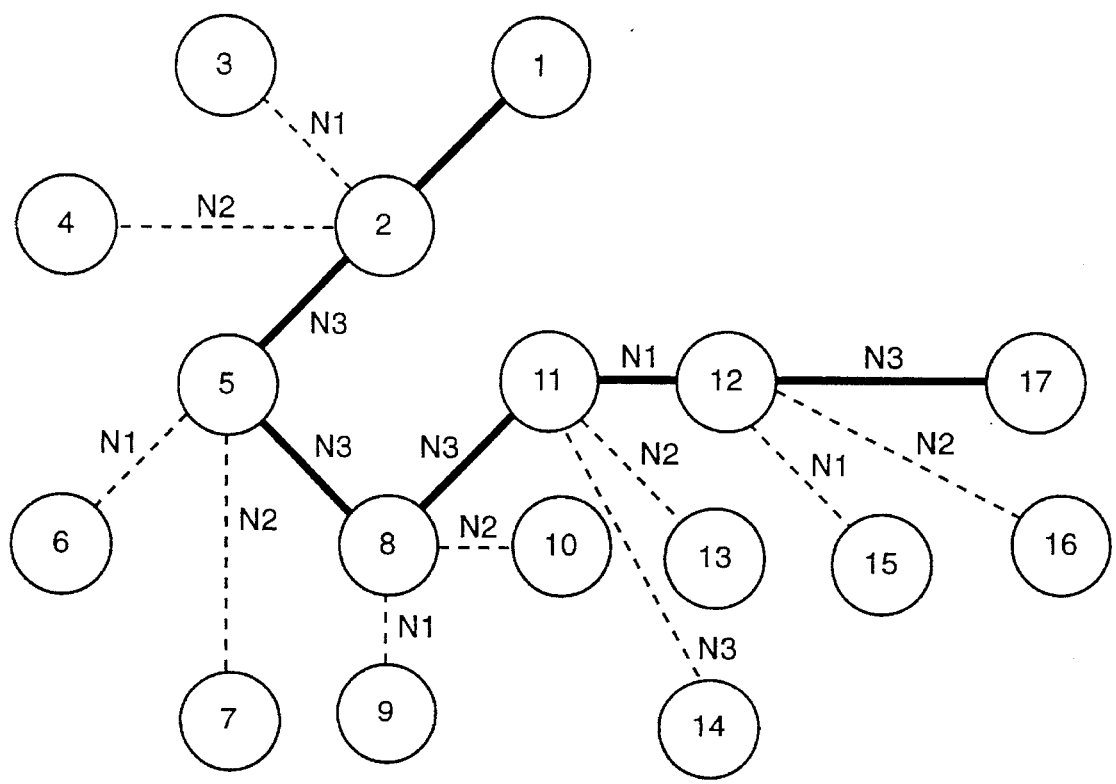
FIG. 3 shows a diagram of state transition of the network by the method in FIG. 2.

FIG. 3 shows the state transition as a model, corresponds to the flowchart in FIG. 2. It is supposed that state of the network transits from "1" in FIG. 3 to "2". The next state of the network stays "2" when the judgment on step 7 is $\Delta V_i$=0, and transits to "3" when the judgment is $\Delta V_i$=±1. The number of neurons is assumed to be 3 and they are expressed by "$N_1$", "$N_2$" and "$N_3$". The state in which the output of neuron N1 is changed from "2" is "3". The state in which the outputs of neurons N2 and N3 are changed is "4" and "5", respectively. When the outputs of neurons are changed as in the table below, the state transits to the one shown right column in the table. The routes of the transition are shown by bold lines in FIG. 3. The routes shown by broken lines do not transit and have no change.

TABLE 1

| Output of Neuron | | | |
| --- | --- | --- | --- |
| N1 | N2 | N3 | State |
| 0 | 1 | 0 | 2 |
| 0 | 1 | 1 | 5 |
| 0 | 1 | 0 | 8 |
| 0 | 1 | 1 | 11 |
| 1 | 1 | 1 | 12 |
| 1 | 1 | 0 | 17 |

The change of coupling weight through learning can be executed not only in the case that the output is changed as in the flowchart above but also with the supposition of "$\Delta Enet_i$" and "$\Delta COST$" which are in the case that the output is changed, with no relation with the existence or non-existence of the change of an output of a neuron in order to be higher self-organization.

Figure 4:
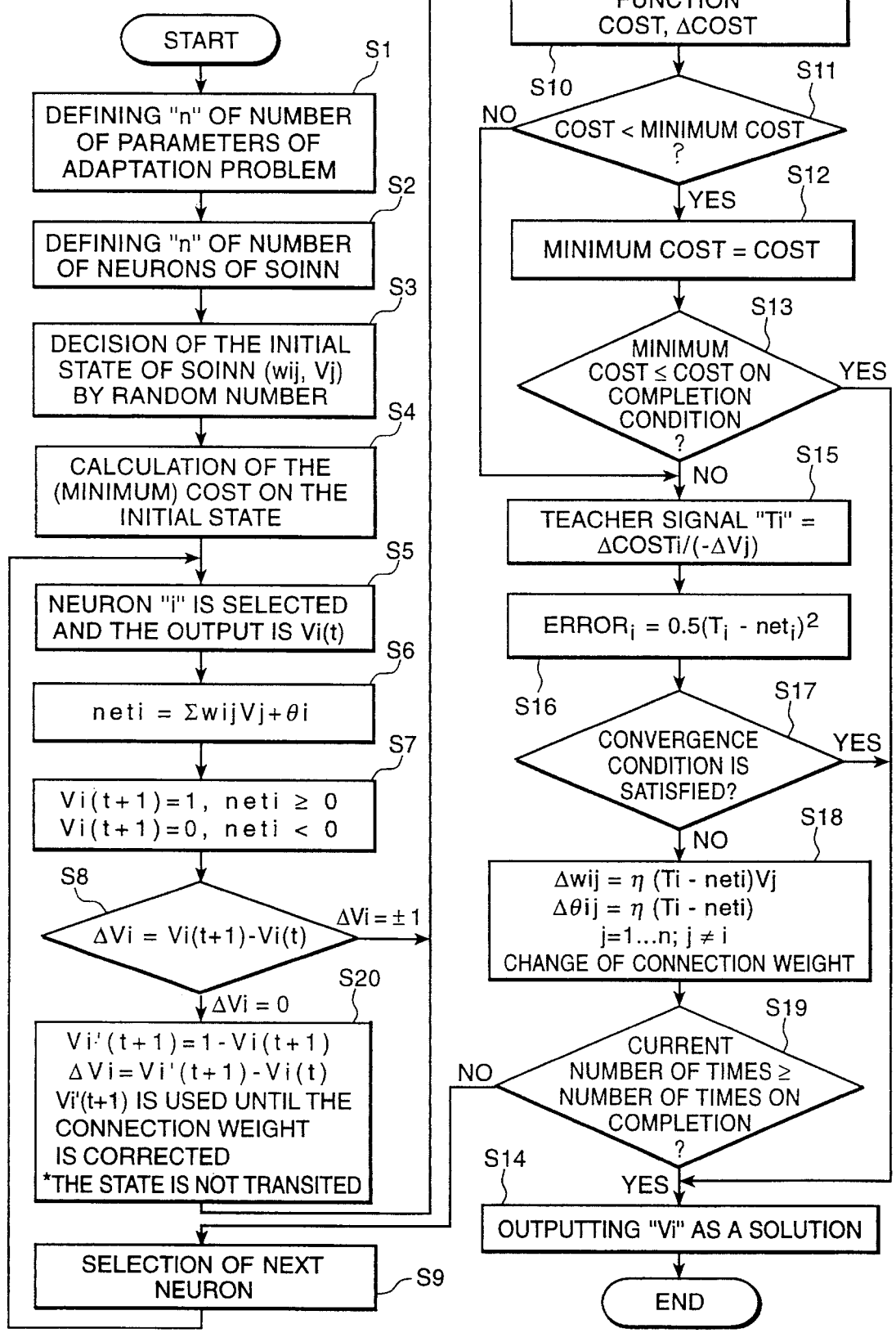
FIG. 4 shows a flowchart of the processing of other method than in FIG. 2.

FIG. 4 shows a flowchart of the self-organization according to $\Delta$COST. FIG. 4 assumes that an output is changed whether the output of neuron is changed or not in order to increase the speed of self-organization. As it is almost the same as that in FIG. 2; the steps that different from those in FIG. 2 are described.

When $\Delta V_i$ is ±1 on step 8 (S8), that is the output of the neuron is changed, $\Delta$COST is calculated on step 10 (S10) in the same way as in FIG. 2. When $\Delta V_i$ is 0, that is the output of the neuron is not changed, $V'_{i(t+1)}$ which is the reverse output of $V_{i(t+1)}$ is defined on step 20 (S20): $V'_{i(t+1)}$ is 1 when $V_{i(t+1)}$ is 0, and it is 0 when $V_{i(t+1)}$ is 1. Using it, $\Delta$COST is calculated on step 10.

Figure 5:
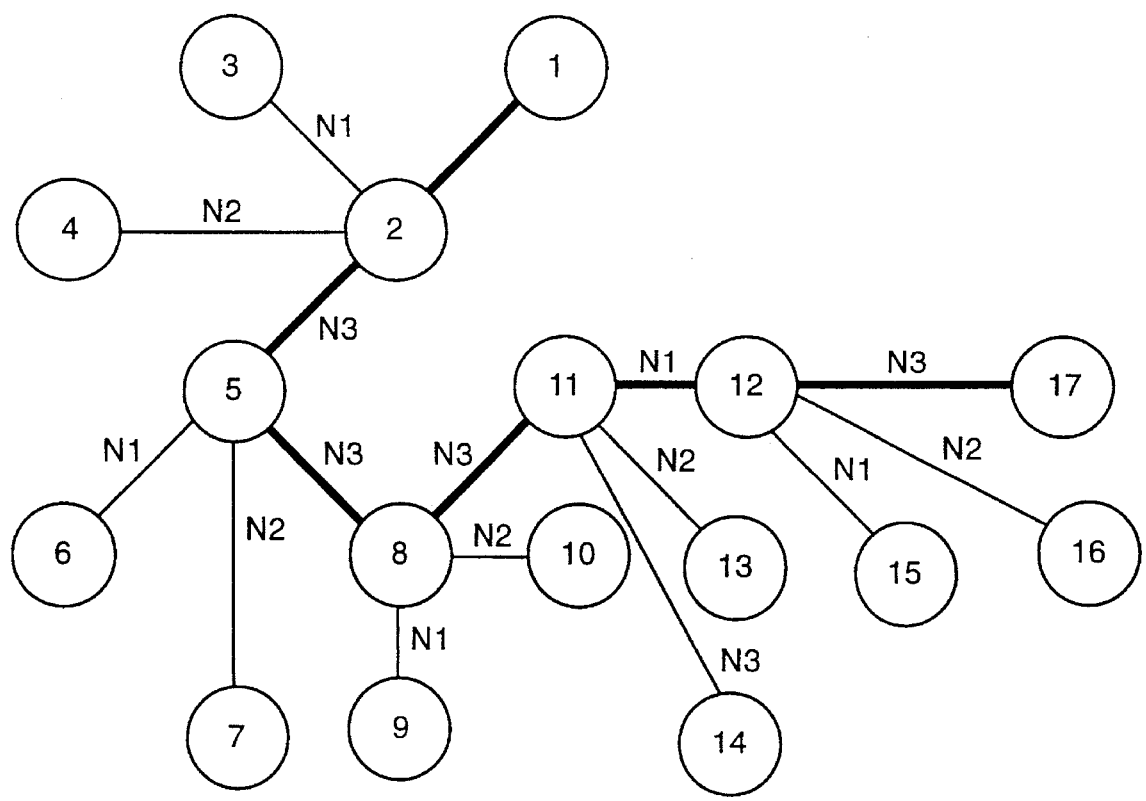
FIG. 5 shows a diagram of state transition of the network by the method in FIG. 4.

FIG. 5 shows a model of state transition of a network, corresponding to the flowchart in FIG. 4. The circumstances of the transition is almost the same as in FIG. 3. The distinctive point of FIG. 5 is: the coupling weight is changed and self-organization is performed even when no transition occur. For example, it is performed not only the route between states "2" and "5" which is transitional but also the ones between states "2" and "3" and "2" and "4" which are not transitional.

Figure 6:
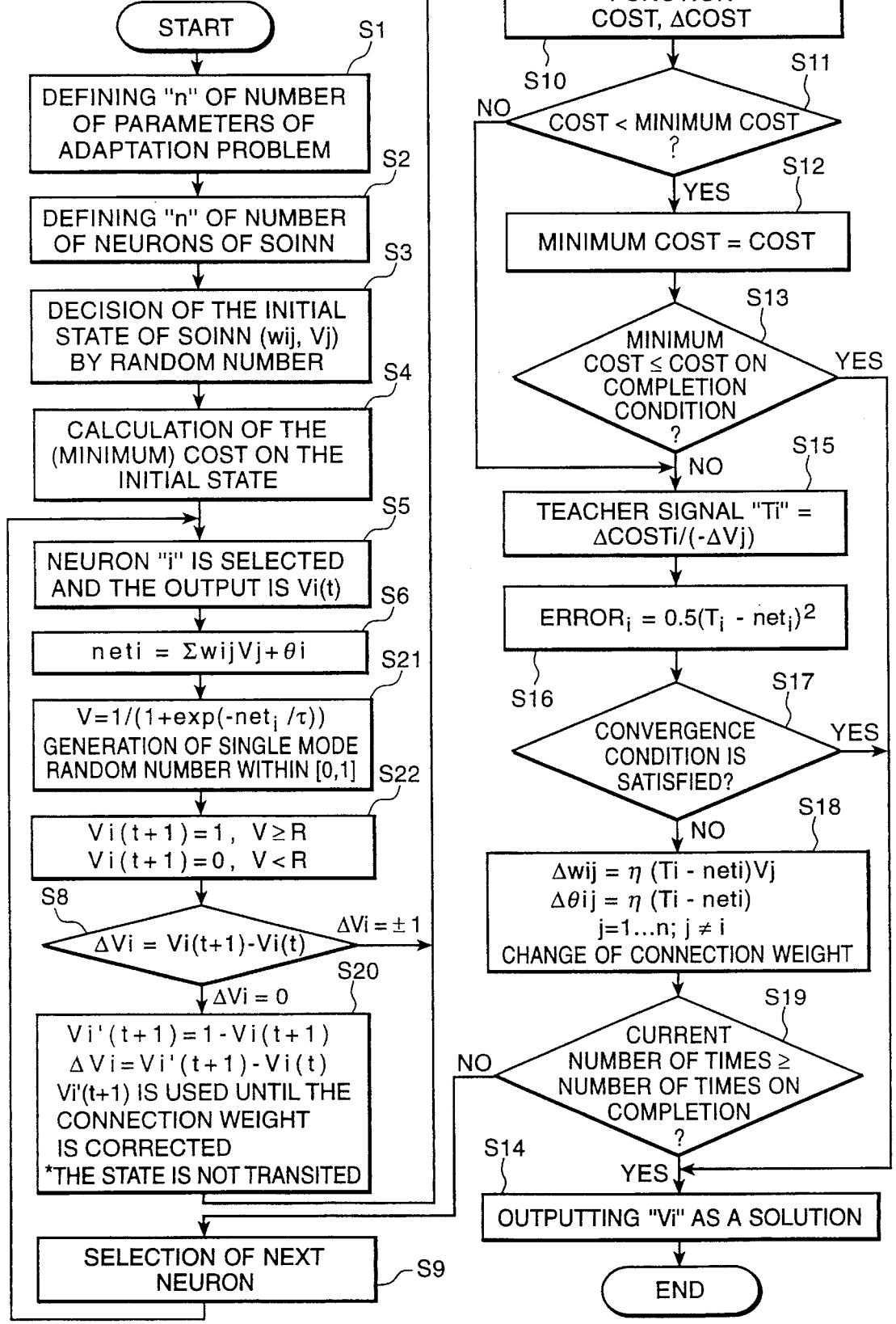
FIG. 6 shows a flowchart of the processing of other method than in FIGS. 2 and 4.

The flowchart in FIG. 6 show the process of self-organization regardless the existence of the change of output of neuron added probability transition for overcoming local minimum.

Though the system for solving an adaptation problem of this invention is rather strong against the local minimum, it can occur that any effective answer cannot be obtained because of the local minimum bringing no effective answer. In FIG. 6, a local minimum can be escaped even on the local minimum by forcibly changing the state according to the probability transition.

According to the result of net calculation on step 6 (S6), "Y" is calculated by the formula of $Y=1/(1+\exp(-net_i/t))$ on step 21 (S21). On step 22 (S22), the output $V_{i(t+1)}$ is determined to be 1 when "Y" is equal to or more than R ($Y \geq R$) and it is 0 when "Y" is less than R ($Y<R$). "t" is a time constant. The processings after it is the same as in FIG. 4.

In this way, probability output transition is effective on the neural network of mutual connection structured by neurons having dispersive inputs and outputs. On the other hand, a local minimum can be effectively escaped by giving a corresponding random number as a probability fluctuation to a successive output on the neural network of mutual connection structured by neurons having continuous input and outputs.

The embodiments in FIGS. 2 to 6 have the presupposition that outputs of other neurons are stable on the predetermined value while each neuron works in unsynchronously, that is a calculation is performed with respect to a neuron, because of the presupposition that whole of the system including neurons are realized in a way of software. It is also possible to work some neurons in parallel, without working by one neuron, when the network is structured realizing the neurons in a way of hardware.

As is clear from the description above, the system in the embodiments executes in the same time both of Markov transition and self-organization of SOINN. The network energy distribution randomly given a coupling weight on the initial stage has no correlation at all with the distribution of cost function. The network transits looking for lower network energy as well as fitting the local distribution in neighbor of the mapping route to the local distribution corresponding to the cost function by Markov transition which is executed with simultaneous self-organization.

The self-organizing network in the embodiments is hardly caught by some local minimums on the transition even if probability transition is not led in, comparing with conventional network of Hopfield's model which converges on a fine local minimum.

The value of error signal "Error" with a teacher signal of a cost change value "ΔCOST" is small as the self-organization further goes, which means that the quantity of correction of coupling weight gradually decreases. It has the effect equivalent to a kind of annealing, in which a large local minimum is calculated not being caught by a fine local minimum by enlarging the correction value on the initial stage, and the precise local minimum is calculated by setting small the correction value on the stage with some coordination of cost change and net energy change.

Conventional Hopfield model has fitted the whole of cost function to a net energy formula. Originally, it is not necessary to coordinate whole of the map of a cost function in order to get at the effective minimum enough for so lying an adaptation problem or a global minimum.

In the self-organizing network in the embodiment, net energy is coordinated with respect to the part of the cost function in order to map only the neighbor of the route to be passed by Markov transition. It is not necessarily a formula of net energy for describing the whole of the cost function and it can be applied to most of all calculable cost functions basically. Therefore, the system in the embodiment has no necessity to solve a complicated fitting problem and can be applied to a cost function to which Hopfield model cannot be applied.

An example is shown here, in which the system for solving an adaptation problem is applied to the problem of a traveling salesman. The problem of a traveling salesman is well known as a NP completion adaptation problem. This is a problem for obtaining the route of shortest distance passing through all the cities when the distance between the "N" of cities is given.

Using the conventional Hopfield model, the coupling weight is given beforehand in order that the energy function of a neural network coincides with the problem and the shortest distance is calculated by the neural network.

The system of the embodiment structures the neural network arranged neurons in square matrix by "N×N". In the matrix, lines from "A" to "J" show the cities and rows from 1 to 10 show the order to visit the cities. For example when the output of the neuron on row 2 of line B is 1, it means that city "B" is visited second. Structuring in this way, only the output of one neuron on each line and on each row is 1, and other outputs must be 0. The answers structure the way round. Energy function "$E_1$" is defined as below in order that energy structuring the way round is minimum.

$$E_1 = \sum_{i=1}^{N} \left( \sum_{k=1}^{N} V_{ik} - 1 \right)^2 + \sum_{k=1}^{N} \left( \sum_{i=1}^{N} V_{ik} - 1 \right)^2$$

The condition for the shortest distance is included in the energy function "$E_2$" as below.

$$E_2 = \sum_{i=1}^{N} \sum_{j=1}^{N} \sum_{k=1}^{N} d_{ij} V_{ik} (V_{j,k+1} + V_{j,k+1})$$

The final energy "E" for solving the problem of a traveling salesman is expressed by the equation of "$E = AE_1 + BE_2$". Though "A" and "B" are random constants, they have to be decided so that the minimum "E" shows the optimal solution of the problem.

Figure 7:
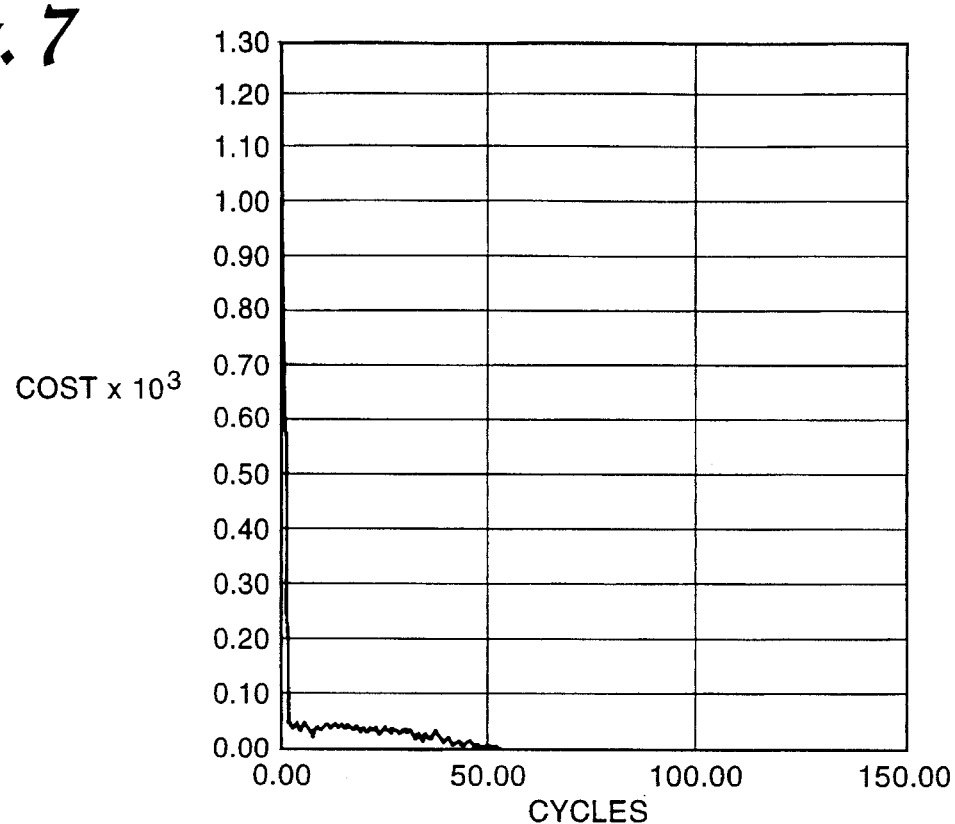
FIG. 7 shows a graph of the change of the cost value when traveling salesman problem if solved by the method in FIG. 4.
Figure 8:
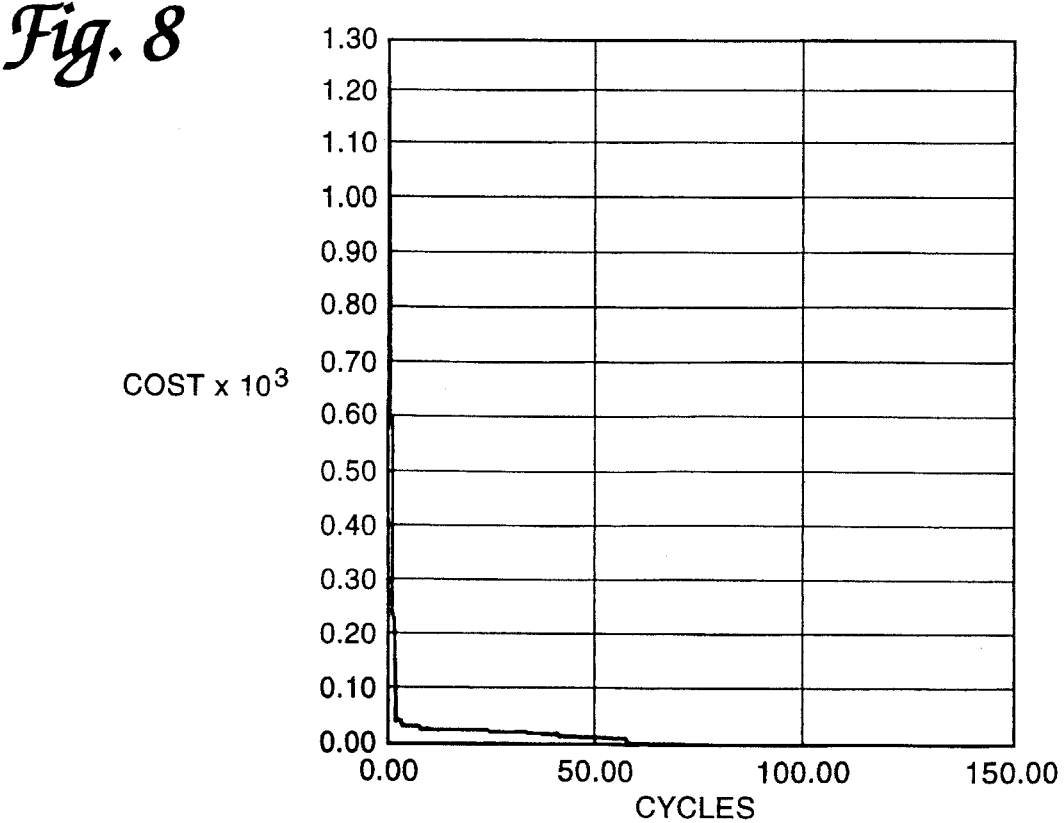
FIG. 8 shows a graph of the change of the minimum cost value when traveling salesman problem if solved by the method in FIG. 4.
Figure 9:
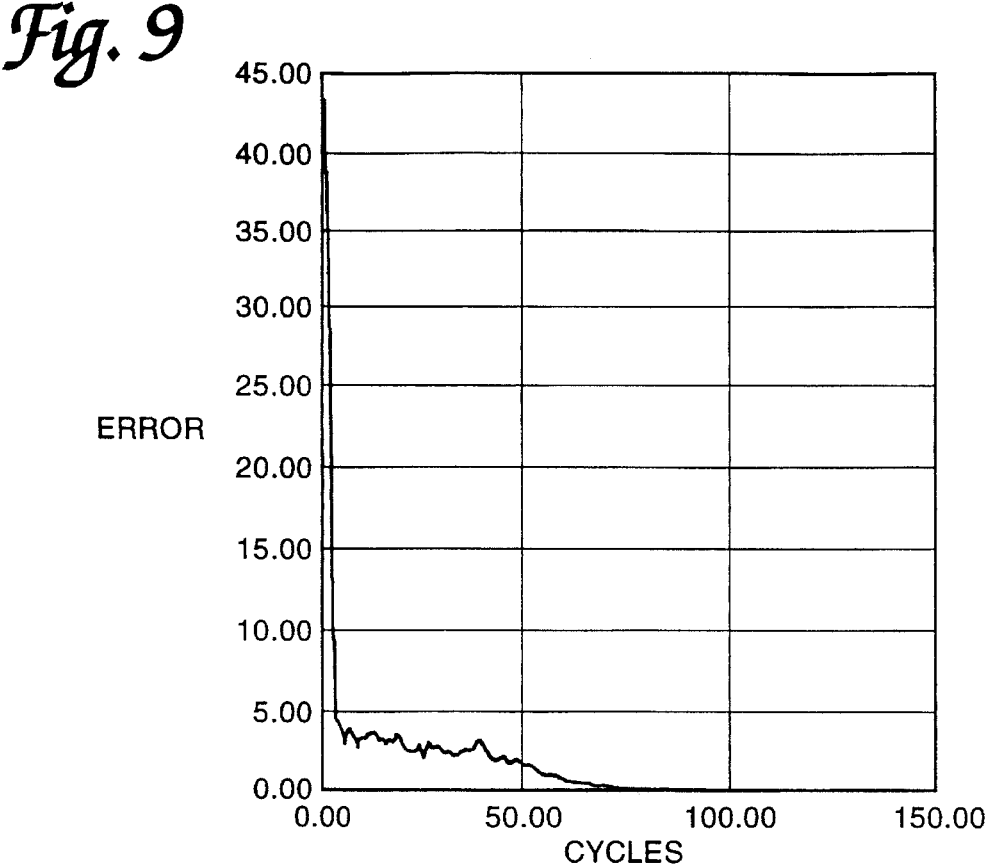
FIG. 9 shows a graph of the change of the mean error value when traveling salesman problem if solved by the method in FIG. 4.

FIGS from 7 to 9 are graphs to show cost (the vertical axis in FIG. 7), the minimum cost (the vertical axis in FIG. 8) and the mean error (the vertical axis in FIG. 9) when the above problem of a traveling salesman is solved according to the flowchart in FIG. 4. The horizontal axes in the three figures show the number of cycles which is equal to the number of neurons. One cycle represents the net calculation with respect to all the neurons by once. The mean error is the value dividing the summation of one cycle error "Error i" by the number of neurons.

Figure 10:
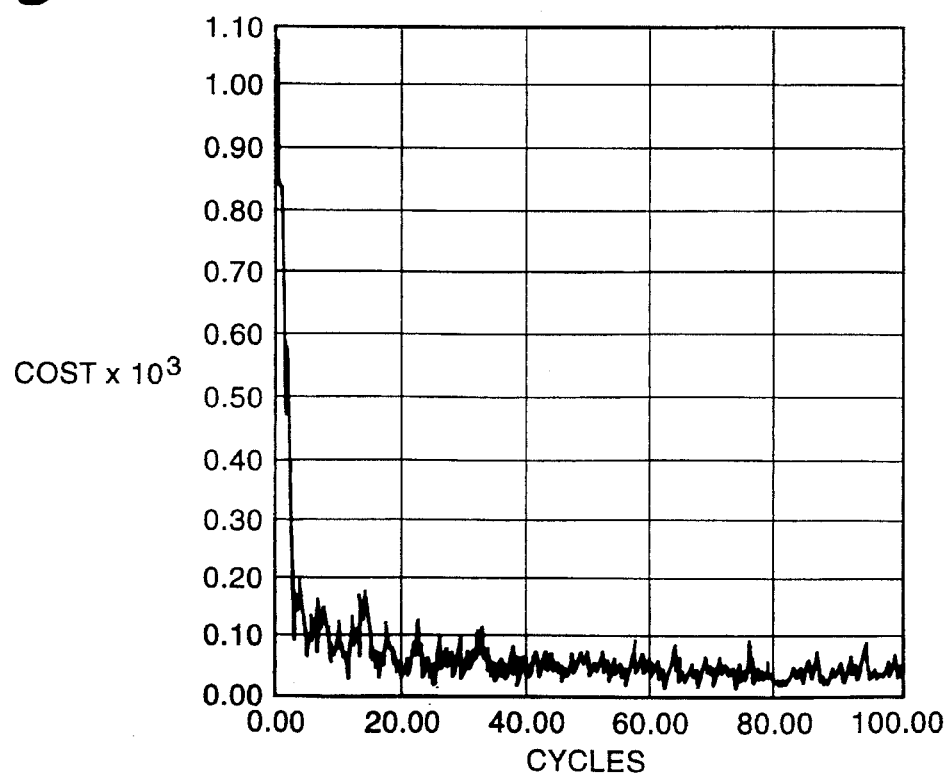
FIG. 10 shows a graph of the change of the cost value when traveling salesman problem (TSP) is solved by the method in FIG. 6.
Figure 11:
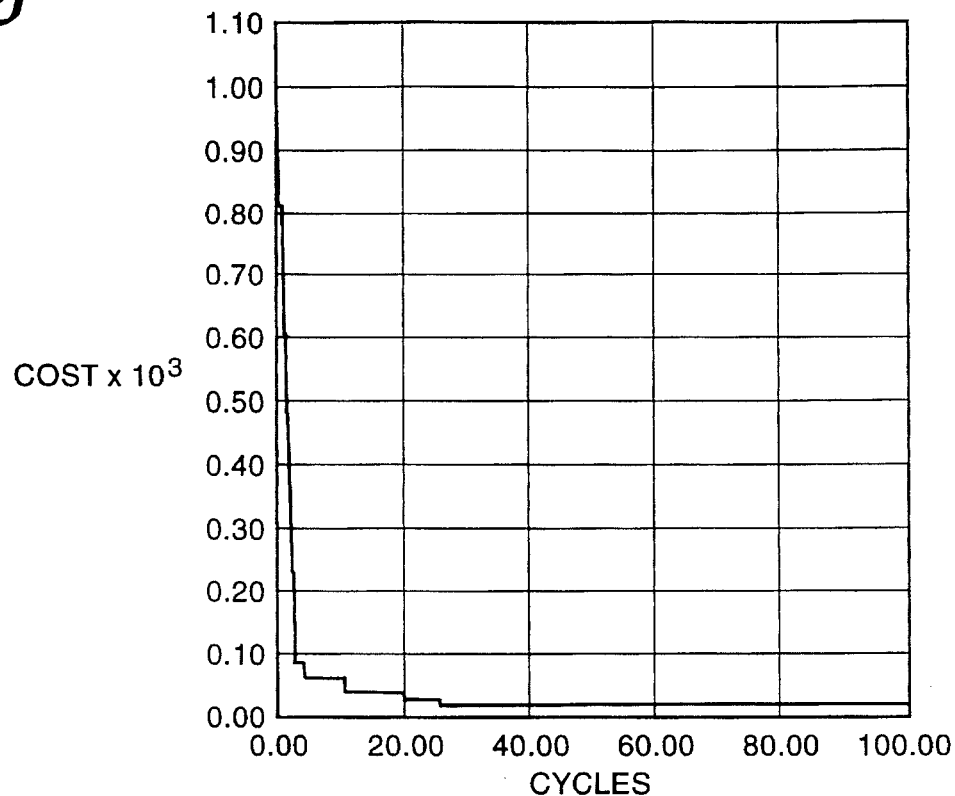
FIG. 11 shows a graph of the change of the minimum cost value when TSP is solved the the method in FIG. 6.
Figure 12:
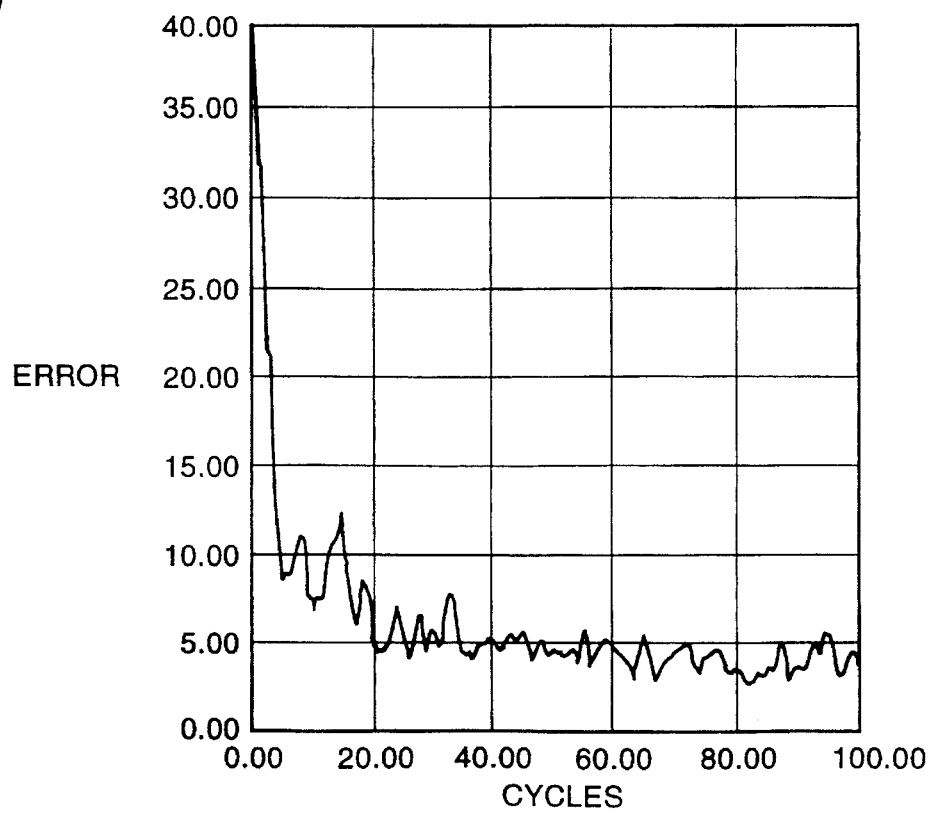
FIG. 12 shows a graph of the change of the mean error value when TSP is solved the the method in FIG. 6.

FIGS. 10 to 12 are the graphs to show the cost (the vertical axis in FIG. 10), the minimum cost (the vertical axis in FIG. 11), the the mean error (the vertical axis in FIG. 12) when the above problem of the traveling salesman is solved according to the flowchart in FIG. 6. The horizontal axes of them show the number of cycles.

Next an embodiment is described below, in which the system for solving the optimal problem in the above embodiment is applied to a portfolio, comparing with the conventional embodiment.

The portfolio problem tries to make risk small by dispersing the investment. It is theorized by Professor McOrbits. Though the theory formulated the problem as the secondary planning method, there was no method for solving the planning method within realizable time considering the number of objects of the actual investment because it is a NP completion problem.

The formula of a portfolio theory is expressed by the definitions below.

Risk of Portfolio (Dispersion) $\sigma_p^2 = \sum_{i=1}^{n} \sum_{j=1}^{n} \sigma_{ij} x_i x_j$ Ratio of Expected Benefit $\mu_p = \sum_{i=1}^{n} \mu_i x_i$ where, $\sum_{i=1}^{n} x_i = 1$ (Standardization of the Total Cost of Investment)

-continued $x_i$: Investment Ratio for Security "$i$"

$\mu_i$: Expected Benefit of Security "$i$"

$\sigma_i$: Co-dispersion of Benefit Ratio of Securities "$i$" and "$j$"

Assuming "$t$" to be a past sample number, $\mu_i$ and $\sigma_{ij}$ are as below.

$$\mu_i = 1/N \sum_{t=1}^{N} \mu_{it}, \sigma_{ij} = 1/N \sum_{t=1}^{N} (\mu_i - \mu_{it})(\mu_j - \mu_{jt})$$

It is the object to obtain vectors of investment ratio ($x_1, x_2, \ldots x_n$) with the minimum risk and the maximum expecting benefit. As it is difficult to fit portfolio problem in the Hopfield's energy formula (formula (1) above), it is generally applied to an energy formula of a model of dispersed value. In a model of a dispersed value, continuous values of investment ratio cannot be adopted basically because an output of each neuron is binary, therefore, a simple portfolio by brand-selection (equally-investing portfolio) is adopted.

The conditions for restruction are added as be low so that it can be applied to Hopfield energy formula.

1. Number of Brands Deciding Condition for Selection

Since "$\Sigma x_i = 1$" which is the condition of standardization of total cost for investment cannot be realized because $x_i$ is either 1 or 0 ($x_i = 1, 0$), the condition is replaced by $\Sigma x_i = S$ (S is a natural number from 1 to n). As the equal investment is adopted, the number of brands comprising the portfolio is determined by the condition.

2. Expecting Benefit Ratio Determining Condition

Selecting portfolio, $\Sigma \mu_i x_i = G$ (G is a predetermined expecting benefit ratio) is usually used for the purpose of minimizing the risk under the fixed expecting benefit ratio.

Adding the above conditions for restruction, brand selecting portfolio problem is expressed by formula (13) be low. Converting the formula into the form to be fit Hopfield energy formula, it is shown by formula (14) below. Whole energy "E" is expressed by formula (16). When $w_{ij}$ and $\theta_i$ are introduced into Hopfield energy formula, they are expressed as in formula (17). $\frac{1}{2}\{\alpha_2(SG)^2 + \alpha_3 S^2\}$ in formula (16) is simply an energy offset in the formula and it can be ignored.

$$\text{Minimize } E = (\alpha_1 E_1 + \alpha_2 E_2 + \alpha_3 E_3)/2 \quad (13)$$

where, $E_1 = \sigma_p^2 = \sum_{i=1}^{n} \sum_{j=1}^{n} \sigma_{ij} x_i x_j$ $E_2 = (\mu_p - G)^2 = \sum_{i=1}^{n} \mu_i x_i - S \times G)^2$ G: Predetermined Expecting Benefit Ratio $$E_3 = \left( \sum_{i=1}^{n} x_i - S \right)^2$$

S: Predetermined Number of Selecting Brands
from $\alpha_1$ to $\alpha_3$: Constants
(Lagrange's Multipliers for Each Restruction Condition)
$x_i = 0, 1$ $$\left. \begin{array}{l} E_1 = \sum_{i=1}^{n} \sum_{j=1}^{n} \sigma_{ij} x_i x_j + \sum_{i=1}^{n} \sigma_{ij} x_i \\ E_2 = \sum_{i=1}^{n} \sum_{j=1}^{n} \mu_i \mu_j x_i x_j + \sum_{i=1}^{n} \mu_i^2 - 2\mu_i SG) x_i \\ E_3 = \sum_{i=1}^{n} \sum_{j=1}^{n} x_i x_j + \sum_{i=1}^{n} (1 - 2S) + S^2 \end{array} \right\} \quad (14)$$

-continued $$E = 1/2 \sum_{i=1}^{n} \sum_{j=1}^{n} (\alpha_1 \sigma_{ij} + \alpha_2 \mu_i \mu_j + \alpha_3) x_i x_j + \quad (16)$$

$$1/2 \sum_{i=1}^{n} \{\alpha_1 \sigma_{ij} + \alpha_2(\mu_i^2 - 2\mu_i SG) + \alpha_3(1 - 2S)\} x_i +$$

$$1/2 \{\alpha_2(SG)^2 + \alpha_3 S^2\}$$

$$\left. \begin{array}{l} W_{ij} = -(1 - \delta_{ij})(\alpha_1 \sigma_{ij} + \alpha_2 \mu_i \mu_j + \alpha_3) \\ \theta_i = -1/2 \{\alpha_1 \sigma_{ij} + \alpha_2(\mu_i^2 - 2\mu_i SG) + \alpha_3(1 - 2S)\} \end{array} \right\} \quad (17)$$

where, $\delta_{ij}$ is Kronecker's $\delta$.

Actuarizing software both of Hopfield model and SOINN, they are comparatively experimented with respect to brands selection portfolio formulated as above, using the data of 50 of actual Tokyo Security brands. The energy formula in Hopfield's model and the cost formula in SOINN are supposed to be the same including Lagrange's multipliers.

Both in Hopfield's model and SOINN, for the outputs on the initial state of the neural networks, 1 or 0 is given in random ratio and works to the stop of Markov transition or to the convergence. The minimum energy on the convergence (the minimum cost) the number of repeat up to the convergence, the result (the risk value of selected portfolio, expecting benefit ratio and the number of selected securities) are recorded.

The constants used in the experimentation are as below.

$\alpha_1 = 0.0001$, $\alpha_2 = 0.005$, and $\alpha_3 = 0.08$ ("$\alpha$" is a Lagrange's multipliers of an energy (cost) function)

$\eta = 0.005$ ("$\eta$" is a feedback constant for self-organization of SOINN.)

$G = 4\%$ ("G" is a predetermined expecting benefit ratio)

$S = 15$ ("S" is a predetermined number of Selected securities)

$n = 50$ ("n" is the number of all the brands.)

In Hopefield's model, the neurons are selected, whose outputs are determined sequentially by random-numbers. 50 times of output determination is represented by one repetition: 50 is equal to all the numbers of neurons. On the other hand in SOINN, the output is sequentially determined from the first neuron, and 50 times of repetition of work for all neurons is represented by one repetition. Table 2 shows the mean values by 100 times of experimentation on each item, changing the system of the random number.

TABLE 2

|  | Hopfield Model | SOINN |
|---|---|---|
| Minimum Energy | 1.020269 | |
| Minimum Cost | | 0.846400 |
| Number of Convergence | 3.67 | 28.92 |
| Number of Times of Conversion of Learning | — | 58.4 |
| Risk Value | 92.1686 | 75.9212 |
| Expecting Benefit Ratio | 3.95918 | 4.00722 |
| Number of Selected Securities | 13.83 | 14.71 |

In the table, the number of convergence is the number of repeats up to the final point of no more change, and the number of the time of convergence of learning is the number of repeats up the the final point that the value of Total Error in Formula (18) is equal to or less than 0.2.

Total Error is the mean value of 10 times of repeats of $$\sum_{i=1}^{50} \{net_i - \Delta ENG/V_{i(t+1)} - V_{i(t)}\}^2$$

In SOINN, it is not judged to be stable convergence until the quantity of feedback by Error value is thoroughly small, because an output can be changed on the repeat after not change period for a while if the change of coupling weight is still active in the neural network by self-organization.

The cost on the stable convergence almost coincides with the minimum cost appeared by the stable convergence.

As shown in Table 2, Hopfield model without probability action on the determination of output of a neuron is easily caught the local minimum, the mean number of time of repetition to the completion of Markov transition is 3.67 times and is small, the the minimum energy value is 1.020269, generally high.

Meanwhile, in SOINN, the mean times of convergence is 28.9 times, rather many, and the mean cost value of convergence is 0.846400, rather low. As SOINN searches more lower cost while changing the coupling weight by self-organization, it is rather tough against the local minimum.

Figure 13:
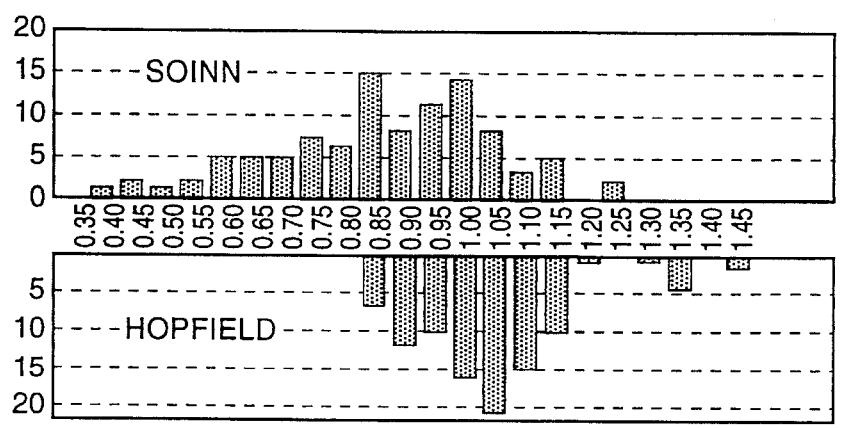
FIG. 13 shows a graph of the histogram of the minimum cost when the system in the embodiment is applied to a portfolio problem, compared with Hopfield model.

FIG. 13 shows a histogram of minimum energy value obtained by 100 times of experimentation.

In order to solve the problem of the local minimum of Hopfield model above, Boltzman machine is generally used, what is added probability action to the decision of output of neuron. It is also possible to add probability action to SOINN. It makes possible to transit the state of local minimum to more lower cost by increasing the number of repetition.

When Boltzman machine and SOINN which is added probability action are adopted on the portfolio problem above, the results are compared below.

The output in both methods is determined to be 1 ($V_i$=1) when RND is equal to or less than $1/(1+e(-net_i/T))$ (RND$\leq 1/(1+e(-net_i/T))$), and to be 0 ($V_i$=0) in other cases. RND is a random number determined at random within the range from 0 to 1 including 0 and 1 ($0 \leq RND \leq 1$). Actually used "T" of time constant is 0.2 in Boltzman machine and 0.5 in SOINN. "T" is different in the two methods because the mean net value of both methods have large difference. That is why the coupling weight of each neuron of SOINN is small in absolute value compared to that of Boltzman machine calculated by fitting the energy formula. The value of "T" is selected so that the mean value of (net/T) of both methods coincides in order to give the probability action in almost the same condition.

Figure 14:
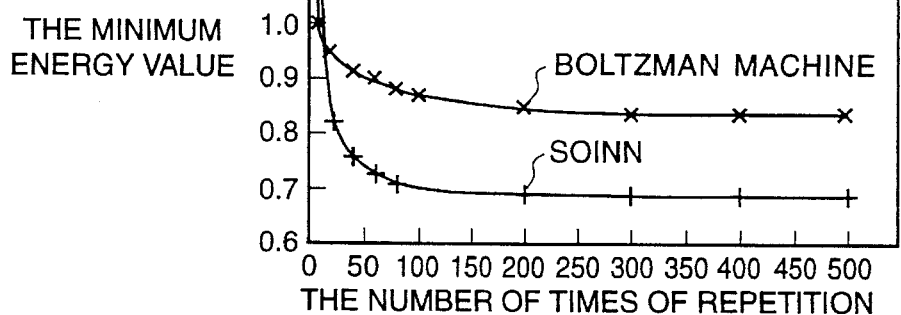
FIG. 14 shows a graph of the process of convergence when probability action is added to the system of the embodiment, compared with Boltzman machine.

FIG. 14 shows the process of change of the minimum energy (cost) when 500 times of repetition is performed. Table 3 shows the mean minimum energy (cost), the mean risk value, the mean expected benefit ratio and the means selected security number reached by 500 times of repetition.

TABLE 3

|  | Boltzman Machine | SOINN |
| --- | --- | --- |
| Minimum Energy | 0.8380 |  |
| Minimum Cost |  | 0.6921 |
| Risk Value | 74.9209 | 61.7913 |
| Expected Benefit Ratio | 3.9576 | 3.9952 |
| Number of Selected Securities | 14.00 | 14.81 |

Boltzman machine and SOINN are plotted the mean values by executing 12 times of experimentation with the different random number systems, and 10 times of experimentation with the different random numbers respectively.

The mean convergence energy value of Boltzman machine is lower than that of Hopfield model by the mean times of repetition less than 10, and the mean minimum energy value reached by 500 times of repetition is 0.8380. The measures against the local minimum is effective by adopting probability action.

The means minimum cost reached by SOINN is further low. The mean minimum cost through 20 times of repetition is 0.8221. It shows that SOINN reached through less than 20 times of repetition to the solution Boltzman machine reaches through 500 times of repetition. The mean minimum cost through 500 times of repetition is 0.6921, which is lower than 0.846400 of the mean convergence cost of SOINN without probability action. It can be understood that addition of probability action to SOINN is also effective against local minimum.

Last, it is described an embodiment of SOINN applied to a problem unsolved by conventional Hopfield model.

In portfolio problem, it is not general to determine the number of securities for selection above. Here, a risk value determination method is used, which is more suitable for actual application. The proposition of this method is "To select a portfolio of expecting benefit ratio higher as possible, with the determined risk value, and with free number of securities of portfolio". The cost function of the problem is shown in formula (19) below.

$$\text{Minimize Cost (Whole Cost)} = \alpha Cost_1 + \beta Cost_2 \qquad (19)$$

$$Cost_1 = \left\{ \sum_{i=1}^{n} \sum_{j=1}^{n} \sigma_{ij} x_i x_j / \left( \sum_{i=1}^{n} x_i \right)^2 - R \right\}^2$$

$$Cost_2 = - \sum_{i=1}^{n} \mu_i x_i / \sum_{i=1}^{n} x_i$$

$$x_i = 1, 0$$

Such cost function is completely impossible to be fit by conventional simple secondary energy formula. In this experimentation, it is carried out by adding probability action to the outputs of SOINN, in the same way as the second experimentation above.

The constants used in the experimentation are: $\alpha$=0.01, $\beta$=0.5, feedback constant "$\eta$"=0.005, time constant "T"= 0.05, and determined risk value "R"=55. The used stock data is the same as above.

Figure 15:
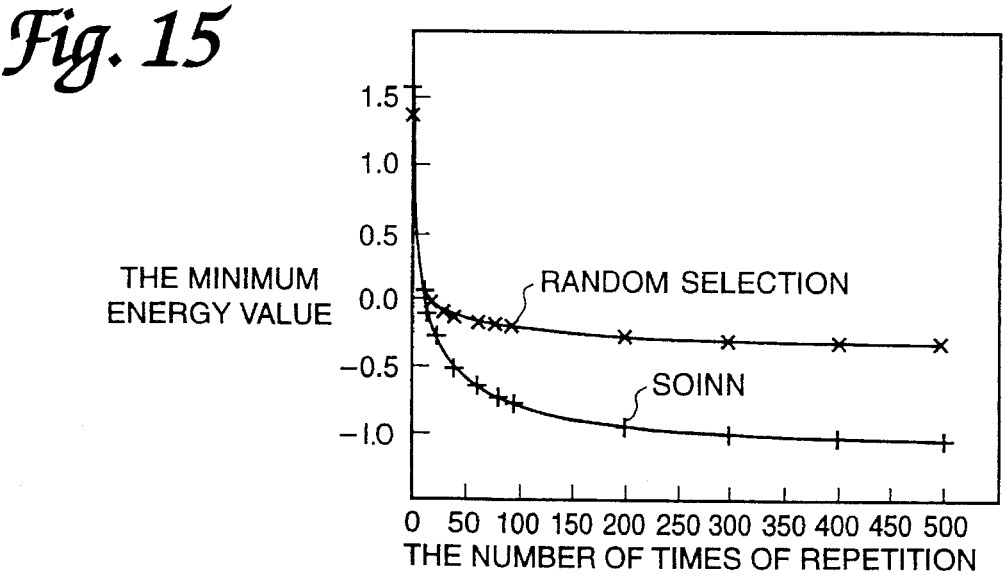
FIG. 15 shows a graph of the process of convergence when the portfolio problem is solved with the method of risk determination by the system of the embodiment, compared with the convergence of a random network.
Figure 16:
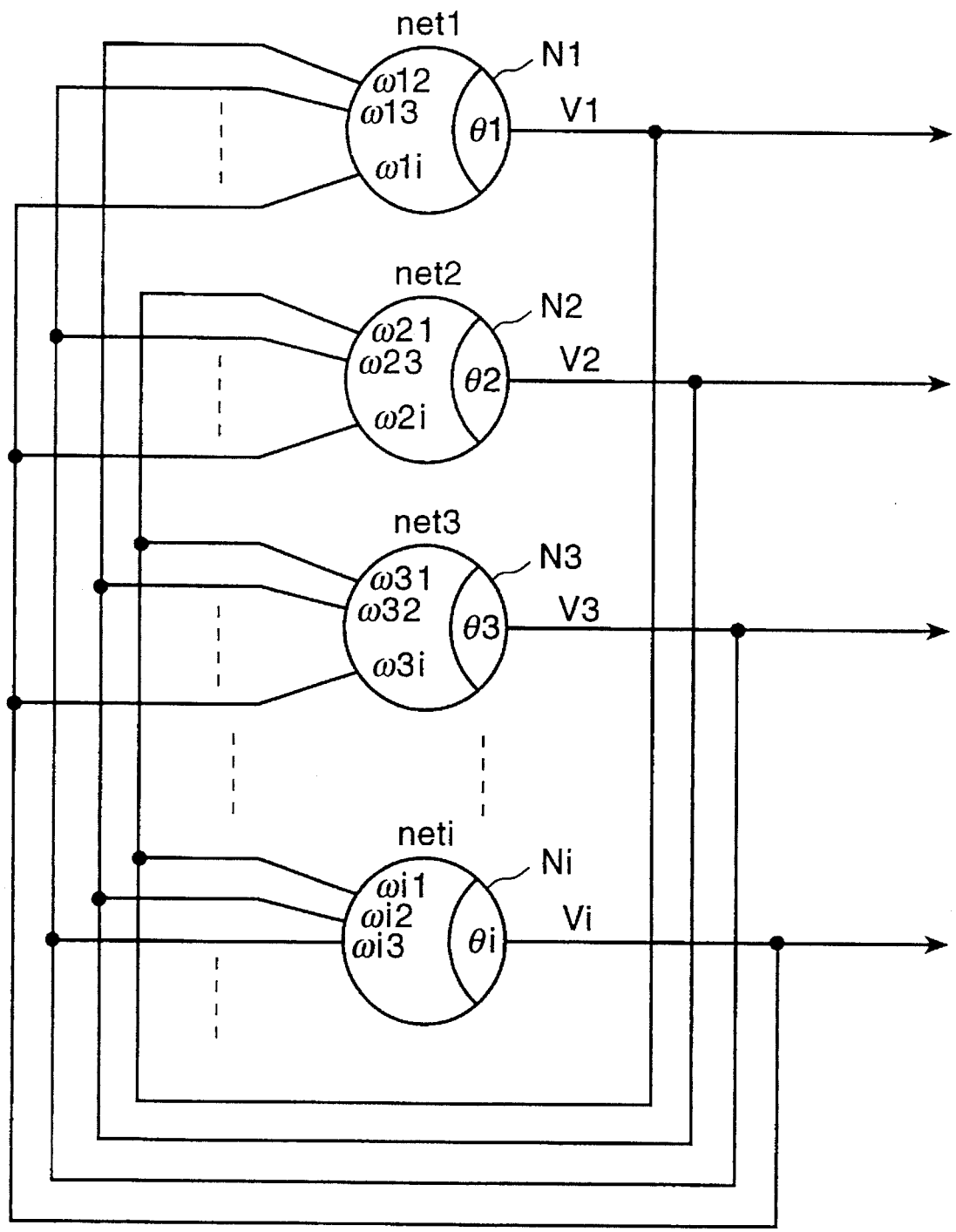
FIG. 16 shows a diagram of a neural network of conventional Hopfield model.

FIG. 15 shows the process of convergence by SOINN compared with the process of convergence by the random selection. The random selection here has the steps that determining sequentially the output of neuron by random numbers, the minimum cost is renewed when the calculated cost is smaller than the minimum cost then. In the experimentation, repeating output decision 500 times, the mean values of 100 times and 20 times of experimentation is plotted random method and SOINN, respectively. Once repetition means the output decision through all neurons.

It is clearly understood that SOINN obtains the effective solution very early compared with the random method. According to this experimentation, the mean minimum cost of SOINN is −0.0330, the mean expecting benefit ratio is 4.2604, and the mean number of selected securities is 17.65. The mean minimum cost of random method is −0.3339.

As above, this invention possible to provide a system which works without solving the fitting problem and flexibly copes with the adaptation problem having a complicated cost function by calculating cost function in the calculation means out of the neural network and by feeding back only the changed value of the cost to the neural network.

What is claimed is:

1. A system for solving an adaptation problem, comprising:

an interconnected neural network with a plurality of neurons, each neuron having an output and a plurality of inputs, said output of each said neuron being connected with connection weights to said inputs of all other neurons, each neuron generating an output value by binarizing a summation of inputs from other neurons that are weighted by said connection weights; and a calculation portion for receiving said output values generated by said neurons, for calculating a cost function based on said output values, for calculating a difference between said cost function calculated currently and said cost function calculated previously, for calculating a change of said connection weights of one or more neurons according to said difference in cost functions, and for changing said connection weights of at least one of said neurons according to said calculated change of said at least connection weights, wherein said connections weights of one or more neurons are successively changed until a predetermined condition is satisfied.

2. A system for solving the adaptation problem claimed in claim 1, wherein each of said neurons has a discrete input/output characteristic, an output of one of said neurons being "1" when a net value of that neuron is equal to or more than 0, said output being "0" when a net value of that neuron is less than 0.

3. A system for solving the adaptation problem claimed in claim 2, wherein output of said each neuron is given a probability transition.

4. A system for solving the adaptation problem claimed in claim 1, wherein each neuron has a characteristic of sequential input and output, and outputs a continuous value corresponding to a net value of each neuron.

5. A system for solving the adaptation problem claimed in claim 4, wherein probability fluctuation is given to said output of said each neuron.

6. A system for solving the adaptation problem claimed in claim 1, wherein said predetermined condition is satisfied when an output of said Interconnected Neural Network is stable.

7. A system for solving the adaptation problem claimed in claim 1, wherein said predetermined condition is satisfied when said interconnected neural network output changes a predetermined number of times.

8. A system for solving the adaptation problem claimed in claim 1, wherein said predetermined condition is satisfied when a predetermined period of time passed after a first change in output is experienced by one of said neurons.

9. A system for solving the adaptation problem claimed in claim 1, wherein said predetermined condition is satisfied when a cost value calculated by said cost calculation means is lower than a predetermined value.

10. A system for solving the adaptation problem claimed in claim 1, wherein said Interconnected Neural Network changes by approximating said $\Delta$COST based on a neighboring function.

11. A system for solving the adaptation problem claimed in claim 1, wherein said Interconnected Neural Network changes by approximating said $\Delta$COST based on neural network energy.

12. A system for solving the adaptation problem claimed in claim 1, wherein said Interconnected Neural Network changes by approximating said $\Delta$COST based on a secondary function.

13. A method for solving an adaptation problem, comprising a plurality of calculation step groups including:
multiplying a coupling weight to a plurality of inputs to generate a multiplication result,
summing said multiplication result to generate an addition result, and
outputting a predetermined calculation result based on said addition result, wherein an output from each calculation step group is an input for multiplication steps in other calculation step groups;

each of said calculation step groups comprising:
i) calculating cost based on outputs from each other calculation step group by applying those outputs as variables to a cost calculation formula,
ii) calculating change in cost for every calculation in said cost calculation step, simultaneously, by calculating a difference between costs before and after said cost calculation; and
iii) correcting at least one coupling weight corresponding to a multiplication formula for calculation step groups according to said difference between the costs;

said method for solving the adaptation problem further comprising:
randomly setting an initial output of each calculation step group and an initial coupling weight of each multiplication formula;
inputting a renewed output generated by performing the multiplying, adding and outputting steps of a calculation step group and by successively performing calculations for other of said calculation step groups;
repeating said performance of said cost calculation of step i), said cost change calculation of step ii) and said correction of steps iii) until a predetermined condition is satisfied; and
realizing an output of said each calculation step group as a solution of said adaptation problem.

14. A method for solving the adaptation problem claimed in claim 13, wherein said function step has a characteristic of discrete input and output, outputting "0" when an output of said addition step is negative, and outputting "1" when it is positive.

15. A method for solving the adaptation problem claimed in claim 14, wherein probability transition is given to an output of each function step.

16. A method for solving the adaptation problem claimed in claim 13, wherein said function step has a characteristic of continuous input and output, outputting continuous value corresponding to an output value of said addition step.

17. A method for solving the adaptation problem claimed in claim 16, wherein a probability fluctuation is given to an output of said function step.

18. A method for solving the adaptation problem claimed in claim 13, wherein said a predetermined condition for is satisfied when an output of each calculation step group is stable.

19. A method for solving the adaptation problem claimed in claim 13, wherein said a predetermined condition is satisfied when calculations in said calculation step group are performed a predetermined number of times.

20. A method for solving the adaptation problem claimed in claim 13, wherein said predetermined condition is satisfied when a predetermined period is passed from the beginning of said calculation.

21. A method for solving the adaptation problem claimed in claim 13, wherein said a predetermined condition is satisfied when a cost value calculated in said cost calculation of step i) lower than a predetermined value.

22. A system for solving the adaptation problem claimed in claim 13, wherein said calculation step group changes by approximating $\Delta COST$ based on a neighboring function.

23. A method for solving the adaptation problem claimed in claim 13, wherein said calculation step group changes by approximating $\Delta COST$ based on neural network energy.

24. A method for solving the adaptation problem claimed in claim 13, wherein said calculation step group changes by approximating $\Delta COST$ based on a secondary function.

25. A method according to claim 13, further comprising the step of completing each of steps i), ii) and iii) after said predetermined condition is satisfied and before said output is realized.

* * * * *